Feb. 9, 1937.  P. RICH  2,069,849
SAFETY SEAL AND PROTECTOR FOR VALVES
Filed March 23, 1934

Inventor
Philip Rich.
Jesse R. Stone
Lester B. Clark
By
Attorneys.

Patented Feb. 9, 1937

2,069,849

UNITED STATES PATENT OFFICE 2,069,849

SAFETY SEAL AND PROTECTOR FOR VALVES

Philip Rich, Houston, Tex.

Application March 23, 1934, Serial No. 716,984

3 Claims. (Cl. 138—89)

The invention relates to an improvement in a safety seal and protector for valves, and particularly of the gas outlet type which may be positioned in the base-boards of residences and business offices.

It is one of the objects of the invention to provide a protector for valve outlets.

It is another object of the invention to provide an auxiliary seal for valve outlets so that there can be no escape of fluid from the valve in event the valve is inadvertently opened.

Another object of the invention is to provide a combination valve seal and protector which may be readily affixed to the valve and readily removed when the valve is to be used.

A still further object of the invention is to provide a rubber nipple which is adapted to be passed over the nozzle of gas outlet valves in order to avoid injury to the furniture or other objects which may come in contact with the valve, and at the same time to form a seal over the nozzle so that there can be no escape of gas in event the valve is inadvertently opened.

Other and further objects of the invention will be readily apparent when the following description is considered in connection with the accompanying drawing wherein.

Figure 1:
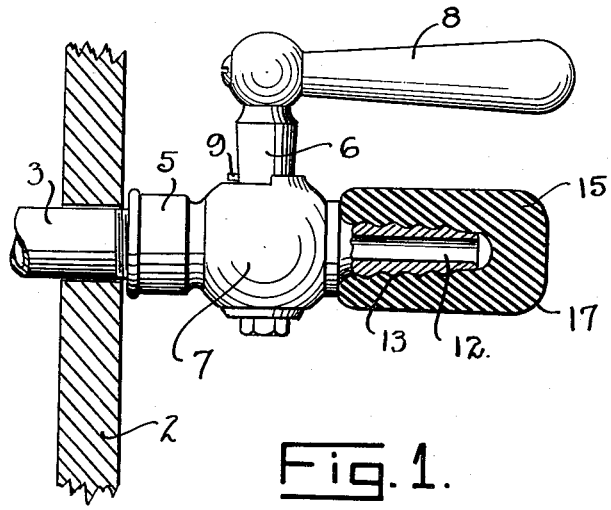
Fig. 1 is a side elevation of a well known form of outlet valve for projection through a wall, and showing the invention applied to the valve.
Figure 2:
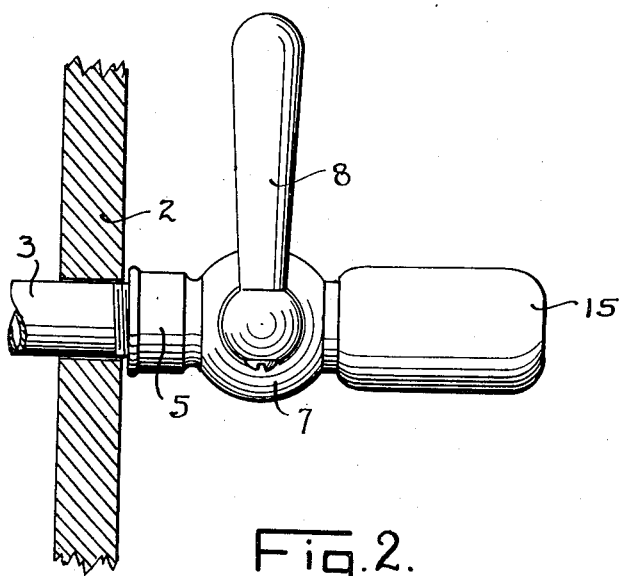
Fig. 2 is a top plan view of the valve in Fig. 1 but showing the valve in closed position.
Figure 4:
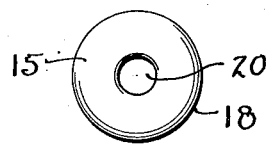
Fig. 4 is an end view looking at the lower end of the protector shown in Fig. 3.

It is common construction to have gas outlet and other similar valves projecting from the wall or base-boards, and particularly from the base-boards in residences and offices. The wall or base-board is illustrated in Figs. 1 and 2 in section, and indicated by the reference numeral 2. The supply pipe 3 usually projects through the wall or base-board and has the valve 5 affixed thereto. The valve may be of any desired type, that shown including a tapered spindle 6 which projects through the valve housing 7, and has the usual opening therein which is moved either in or out of alignment with the passage in the housing by turning of the handle 8. The usual stop member 9 is positioned so that the handle may be turned through an arc of 90° in order to either open or close the valve. Projecting from the valve body is the nozzle 12, the usual type of which has a plurality of corrugations 13 thereon in order that the usual rubber nipple on the flexible hose can be inserted over the nozzle to form a conduit for the fluid passing through the valve.

When valves of this type are not in use, it is usual to disconnect the flexible hose, leaving the nozzle 12 exposed, and with the handle 8 in the position shown in Fig. 2.

It has been found that valves left in this position are exceedingly dangerous, first because in passing the valve and in moving furniture about the room, it is not uncommon that the handle 8 is struck by some object and the valve may be opened completely or to such an extent that the gas or other fluid will be allowed to leak from the valve. In some instances children playing about the room have opened gas outlets with very disastrous results. Another detrimental feature of such valve is that the nozzle 12 projects a considerable distance from the base-board and is often struck by furniture or by a person walking past the valve. Severe injuries have been sustained by striking of the ankle against such nozzle and scratching and marring of the furniture has also occurred when the furniture comes in contact with the exposed nozzle.

Figure 3:
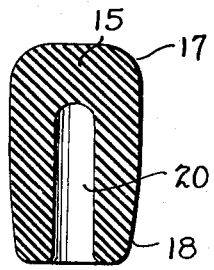
Fig. 3 is a transverse sectional view of the combination safety seal and protector.

With the foregoing detrimental features of the valve in mind, the present combination protector and seal has been devised. The invention contemplates a body of rubber or other suitable material such as 15, illustrated in Fig. 3. This body may be molded or otherwise formed, and has a rounded outer surface 17 which may be tapered as at 18, or may be formed in any desired configuration. For purposes of simplicity, the smooth rounded surface has been here provided. The interior of the body is recessed at 20 with a bore of such a size that it will fit snugly over the nozzle 12.

When the nipple is positioned over the nozzle as shown in Figs. 1 and 2, a buffer or protector will be provided over the nozzle which will serve not only to protect the nozzle, but also to avoid a scratching or marring of the furniture or personal injury. In addition to this protective feature, the nipple fits so snugly about the nozzle 12 that it forms a seal therewith, and will prevent the escape of any fluid through the nozzle in event the valve is opened. Thus, if the valve handle is struck or children playing about the room should open the valve, there can be no escape of gas or other fluid into the room because the nipple has sealed the nozzle of the valve.

It will be readily apparent that the resilient body serves the dual purpose of sealing the valve and protecting the valve against injury, as well as protecting other objects which may come in contact with the valve.

While one form of the invention has been shown and described, it is contemplated that the protective member or nipple may take any desired form or configuration, so long as the sealing and protective functions are maintained.

Having described the invention what is claimed is:

1. A buffer for gas outlets comprising a body of resilient material telescoped over the outlet to form a cushion or buffer for impacts against said outlet.

2. An auxiliary seal for gas outlets to prevent the escape of gas in event the outlet is inadvertently opened comprising a body of resilient material, a recess therein whereby the body may be passed over the outlet so that the inherent resiliency of the material will form a seal therewith.

3. A seal for gas outlets comprising a rubber nipple, a recess therein of lesser size than the gas outlet, said nipple being adapted to be passed over the outlet and form a seal therewith because of the inherent resiliency of the rubber, and prevent the escape of gas from the outlet.

PHILIP RICH.